United States Patent
Ganesh et al.

(10) Patent No.: US 9,497,564 B2
(45) Date of Patent: Nov. 15, 2016

(54) APPARATUS AND METHOD FOR OPTIMAL SCHEDULING OF ENVELOPE UPDATES TO SIM CARD

(71) Applicant: Qualcomm Incorporated, San Diego, CA (US)

(72) Inventors: Shriram Ganesh, San Diego, CA (US); Damir Didjusto, San Diego, CA (US); Xiaomin Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/759,218

(22) Filed: Feb. 5, 2013

(65) Prior Publication Data

US 2014/0220949 A1    Aug. 7, 2014

(51) Int. Cl.
*H04W 4/00* (2009.01)
*H04L 29/08* (2006.01)

(52) U.S. Cl.
CPC ............ *H04W 4/001* (2013.01); *H04L 67/325* (2013.01); *H04W 4/003* (2013.01)

(58) Field of Classification Search
CPC ... H04W 4/003; H04W 88/06; H04W 48/08; H04W 4/00; H04M 1/274516; H04M 1/72525
USPC ....................... 455/418, 414.1; 370/252, 241
See application file for complete search history.

(56) References Cited

U.S. PATENT DOCUMENTS

| | | | |
|---|---|---|---|
| 8,009,569 B2* | 8/2011 | Tagore-Brage | H04L 12/5693 370/236 |
| 8,185,157 B2 | 5/2012 | Shi | |
| 2002/0133830 A1* | 9/2002 | Kim et al. | 725/142 |
| 2004/0076131 A1 | 4/2004 | Qu et al. | |
| 2005/0172242 A1* | 8/2005 | Vienneau | G06F 8/38 715/801 |
| 2006/0109381 A1* | 5/2006 | Kim | H04N 5/44504 348/569 |
| 2010/0153664 A1 | 6/2010 | Yoshida | |
| 2010/0174680 A1 | 7/2010 | Yamagishi et al. | |
| 2010/0175067 A1 | 7/2010 | Appe et al. | |

(Continued)

FOREIGN PATENT DOCUMENTS

EP    1339194 A2    8/2003
WO    WO-0131860 A1    5/2001

OTHER PUBLICATIONS

3GPP 31.102 V 10.2.0: "3rd Generation Partnership Project, Technical Specification Group Core Network and Terminals, Characteristics of the Universal Subscriber Identity Module (USIM) application", 3GPP Draft, 31102-A20, 3rd Generation Partnership Project (3GPP), Mobile Competence Centre, 658, Route Des Lucioles, F-86921 Sophia-Antipolis Cedex, France, vol. CT WG6, Jun. 21, 2011, XP050536653, [retrieved on Jun. 21, 2011] Section L.3.
International Search Report and Written Opinion—PCT/US2014/012778—ISA/EPO—Jun. 23, 2014.

(Continued)

*Primary Examiner* — Chuong A Ngo
(74) *Attorney, Agent, or Firm* — Loza & Loza LLP

(57) ABSTRACT

Aspects of the present disclosure are directed to an apparatus and methods that may improve scheduling of envelope updates to a SIM. An apparatus for wireless communication is configured to receive a plurality of updates in one or more envelope commands, categorize the updates into a plurality of groups having respective priorities, and send the updates to a SIM at the apparatus in order according to the respective priorities. Other aspects, embodiments, and features are also claimed and described.

32 Claims, 7 Drawing Sheets

(56) References Cited

U.S. PATENT DOCUMENTS

| | | | |
|---|---|---|---|
| 2010/0195643 A1* | 8/2010 | Kodali et al. | 370/352 |
| 2010/0285782 A1 | 11/2010 | Boutie et al. | |
| 2011/0035146 A1* | 2/2011 | Guha | G08G 1/09675 701/533 |
| 2011/0196884 A1 | 8/2011 | Gandhi et al. | |
| 2012/0077494 A1 | 3/2012 | Kim et al. | |
| 2012/0108198 A1 | 5/2012 | Edge et al. | |
| 2012/0275321 A1* | 11/2012 | Ruvalcaba | H04W 4/003 370/252 |
| 2013/0029726 A1 | 1/2013 | Berionne et al. | |
| 2013/0178195 A1* | 7/2013 | Luna | H04W 24/04 455/414.1 |
| 2015/0009930 A1* | 1/2015 | Rapaport | H04L 1/1825 370/329 |

OTHER PUBLICATIONS

3GPP TS 31.111, V10.2.0, "3rd Generation Partnership Project; Technical Specification Group Core Network and Terminals; Universal Subscriber Identity Module (USIM) Application Toolkit (USAT) (Release 10)", 3GPP Standard; 3GPP TS 31.111, 3rd Generation Partnership Project (3GPP), Mobile Competence Centre ; 650, Route Des Lucioles ; F-06921 Sophia-Antipolis Cedex; France, No. V10.2.0, Apr. 11, 2011, pp. 1-115, XP050477504, [retrieved on Apr. 11, 2011].

International Preliminary Report on Patentability—PCT/US2014/012778, The International Bureau of WIPO—Geneva, Switzerland, Apr. 24, 2015.

Taiwan Search Report—TW103103659—TIPO—Jul. 20, 2015.
Taiwan Search Report—TW103103659—TIPO—May 2, 2016.

* cited by examiner

APPARATUS AND METHOD FOR OPTIMAL SCHEDULING OF ENVELOPE UPDATES TO SIM CARD

TECHNICAL FIELD

The technology discussed in this patent application relates generally to wireless communication systems, and more particularly, to communications between mobile equipment and one or more subscriber identity module ("SIM") cards. Embodiments enable and provide scheduling mechanisms to enhance communications between mobile equipment and SIM equipment.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

A universal integrated circuit card (UICC) is a smart card that may be used in a mobile equipment in various wireless communication networks, and may include several applications that enable the mobile equipment to access the wireless networks. For example, in 3GPP GSM and UMTS networks the UICC includes a SIM application and/or a USIM application; and in 3GPP2 CDMA networks the UICC includes a CSIM application. In this disclosure, the UICC including one or more applications may be referred to as a SIM.

The mobile equipment (ME) is capable of communicating with the SIM card over a SIM-ME interface, utilizing certain envelope commands. These envelope commands can enable the mobile device to notify events and updates about the ME to the SIM card. For example, if the radio access technology changes, this change is notified to the SIM utilizing an envelope command.

Within an envelope command, there can be several such updates at the same time to notify the SIM, and each of these updates is sent in the order received. That is, the SIM may only be notified of one update at a time, and only after the response for the update is received, is the next update sent. If the SIM replies to an update with a busy response code, the ME will retry the envelope update, and it may be up to 30 seconds of delay until the next envelope is sent to the SIM.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure are directed to an apparatus and methods that may improve scheduling of envelope updates to a SIM. In one aspect, a method of wireless communication operable at a mobile device is provided. The method includes receiving a plurality of updates in one or more envelope commands, categorizing the updates into a plurality of groups having respective priorities, and sending the updates to a SIM at the mobile device in order according to the respective priorities.

Another aspect of the disclosure provides an apparatus for wireless communication. The apparatus includes means for receiving a plurality of updates in one or more envelope commands, means for categorizing the updates into a plurality of groups having respective priorities, and means for sending the updates to a SIM at the apparatus in order according to the respective priorities.

Another aspect of the disclosure provides a computer program product that includes a computer-readable storage medium. The storage medium includes code for causing a mobile device to receive a plurality of updates in one or more envelope commands, categorize the updates into a plurality of groups having respective priorities, and send the updates to a SIM at the mobile device in order according to the respective priorities.

Another aspect of the disclosure provides an apparatus for wireless communication. The apparatus includes at least one processor, a communication interface coupled to the at least one processor, and a memory coupled to the at least one processor. The at least one processor is configured to receive a plurality of updates in one or more envelope commands, categorize the updates into a plurality of groups having respective priorities, and send the updates to a SIM at the apparatus in order according to the respective priorities.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure are directed to an apparatus and methods that may improve scheduling of envelope updates to a SIM. When a user equipment (UE) has several updates in the queue for the SIM, there may be some updates which have higher time sensitivity than others. For example, a call control notification for a packet data network connection request on LTE generally has a higher time sensitivity than a language selection update. In another example, if a user is selecting items from the SIM Toolkit menu, and an access technology change envelope is being retried for an extended period of time (e.g., 30 seconds), the user might think that the UE (e.g., mobile phone) is stuck and reset the device. Scenarios like these may be avoided or reduced according to aspects of the disclosure.

Figure 1:
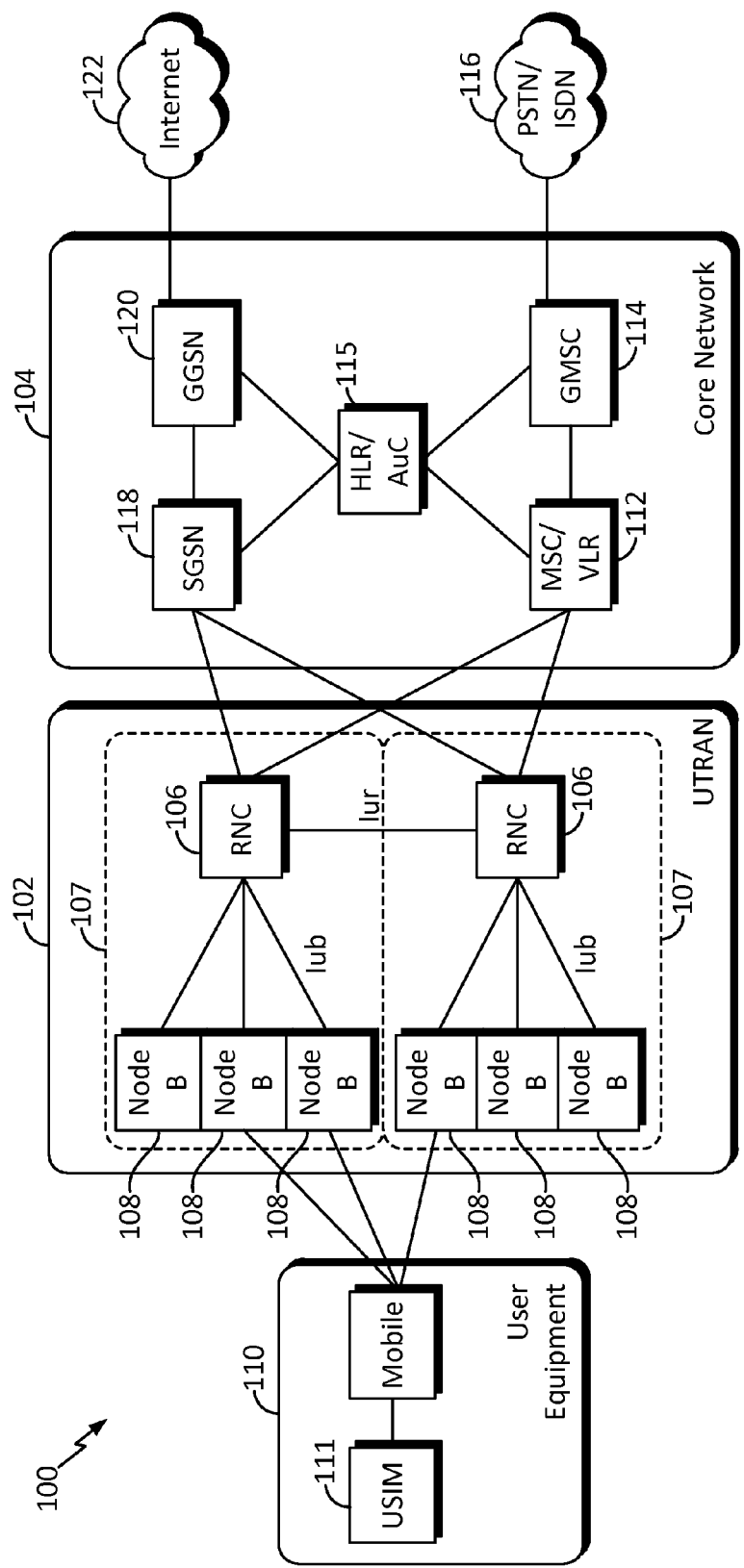
FIG. 1 is a block diagram conceptually illustrating an example of a telecommunications system according to some embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may include a universal subscriber identity module (USIM) 111, which contains a user's subscription information to a network. The USIM may be referred to as SIM card in this disclosure. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC, may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
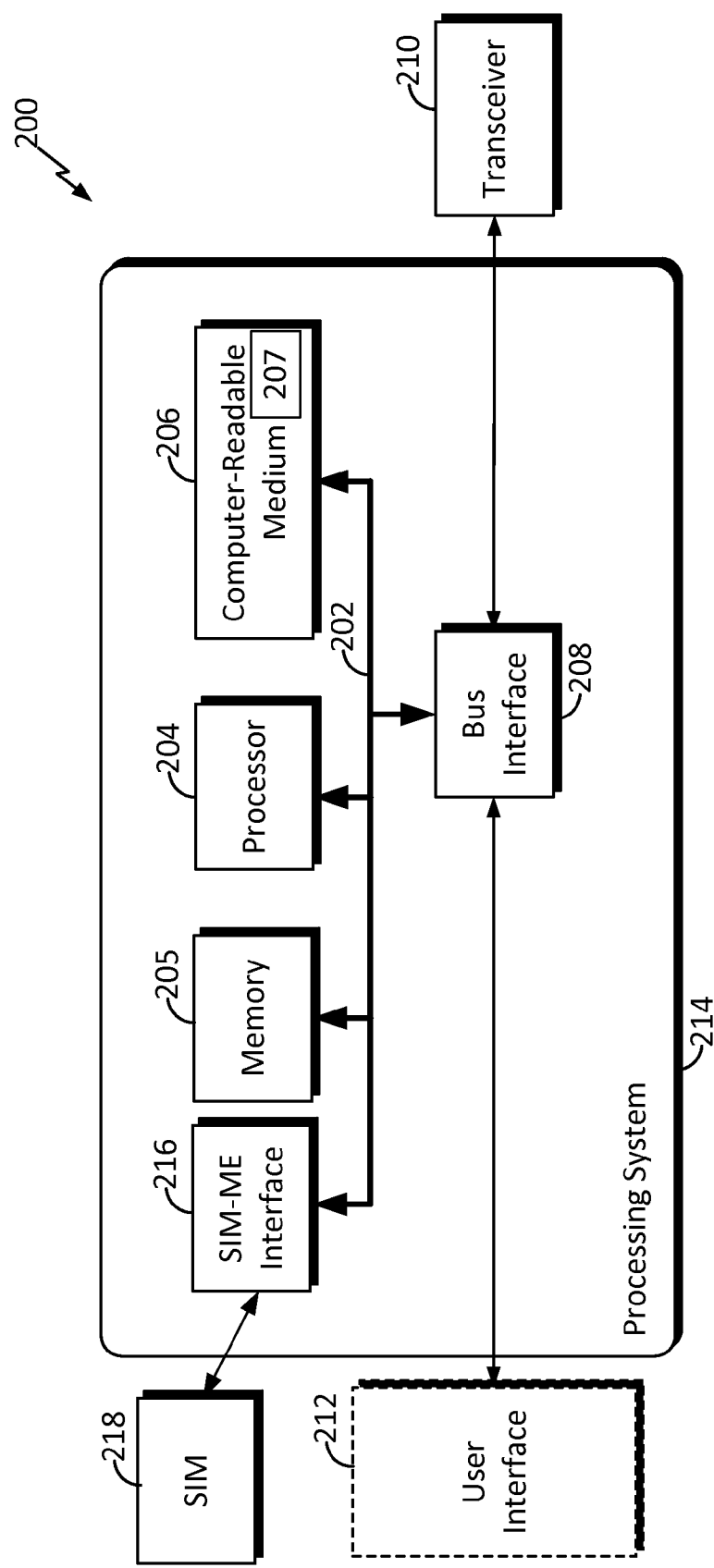
FIG. 2 is a block diagram illustrating an example of a hardware implementation for an apparatus employing a processing system according to some embodiments.

FIG. 2 is a conceptual diagram illustrating an example of a hardware implementation for an apparatus 200 employing a processing system 214. In accordance with various aspects of the disclosure, an element, or any portion of an element, or any combination of elements may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, computer-readable media (represented generally by the computer-readable medium 206), and a SIM mobile equipment (SIM-ME) interface 216. The bus 202 may also link various other circuits such as timing sources, peripherals, voltage regulators, and power management circuits, which are well known in the art, and therefore, will not be described any further. A bus interface 208 provides an interface between the bus 202 and a communication interface such as a transceiver 210. The transceiver 110 provides a means for communicating with various other apparatus over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software 207 stored on the computer-readable medium 206. The software, when executed by the processor 204, causes the processing system 214 to perform the various functions described infra for any particular apparatus. The computer-readable medium 206 may also be used for storing data that is manipulated by the processor 204 when executing software.

One or more processors 204 in the processing system may execute software (e.g., 207). Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In various aspects, the apparatus 200 may be embodied as a UE that is equipped with a SIM 218 for accessing a wireless network. In one aspect, the SIM 218 may be a UICC 111 having a USIM application for accessing UMTS networks. The UE 200 communicates with the SIM 218 over the SIM-ME interface 216. In one aspect, by way of example, the SIM 218 may be a UICC that has a Card Application Toolkit (CAT). CAT is a set of generic commands and procedures that provide the SIM 218 the mechanisms to communicate with a UE. Examples of some generally known CAT mechanisms include profile download, proactive UICC commands, and envelope commands. Additional information on CAT is available from, for example, ETSI publication TS 102 223 V4.3.0 Technical Specification, which is incorporated herein by reference.

Envelope commands provide the mechanisms for a UE to provide information on events and updates to a SIM. For example, for all call set-up attempts, the UE first pass the call set-up details to the SIM, using an ENVELOPE (CALL CONTROL) command. In another example, a set of events for the UE to monitor may be supplied by the SIM to the UE using suitable proactive commands. If an event which is part of the set subsequently occurs, the UE informs the SIM using a suitable ENVELOPE command. Non-limiting examples of these events include a mobile terminated (MT) call event, call connected event, call disconnected event, location status event, user activity event, idle screen available event, card reader status event, language selection event, browser termination event, data available event, channel status event, access technology change event, display parameters changed event, and local connection event. However, the present disclosure is not limited thereto.

When multiple event updates occur, they may be sent to the SIM in the order of their occurrence. If the SIM is busy and unable to response, the event updates may be placed in a queue at the UE. For example, the queue may be located in the memory 205. When there are several updates in the queue, there may be some updates which have higher time sensitivity than others. For example, a call control event (e.g., call connected event or call disconnected event) generally has a time sensitivity higher than that of a language selection event. However, in the related art, the event updates are generally stored in the queue in the same order the events occur in time. That is, in a conventional system all updates carried in envelope commands are processed in the order they are received, as there is no assignment of relative priorities or time-sensitivity of these updates.

Figure 3:
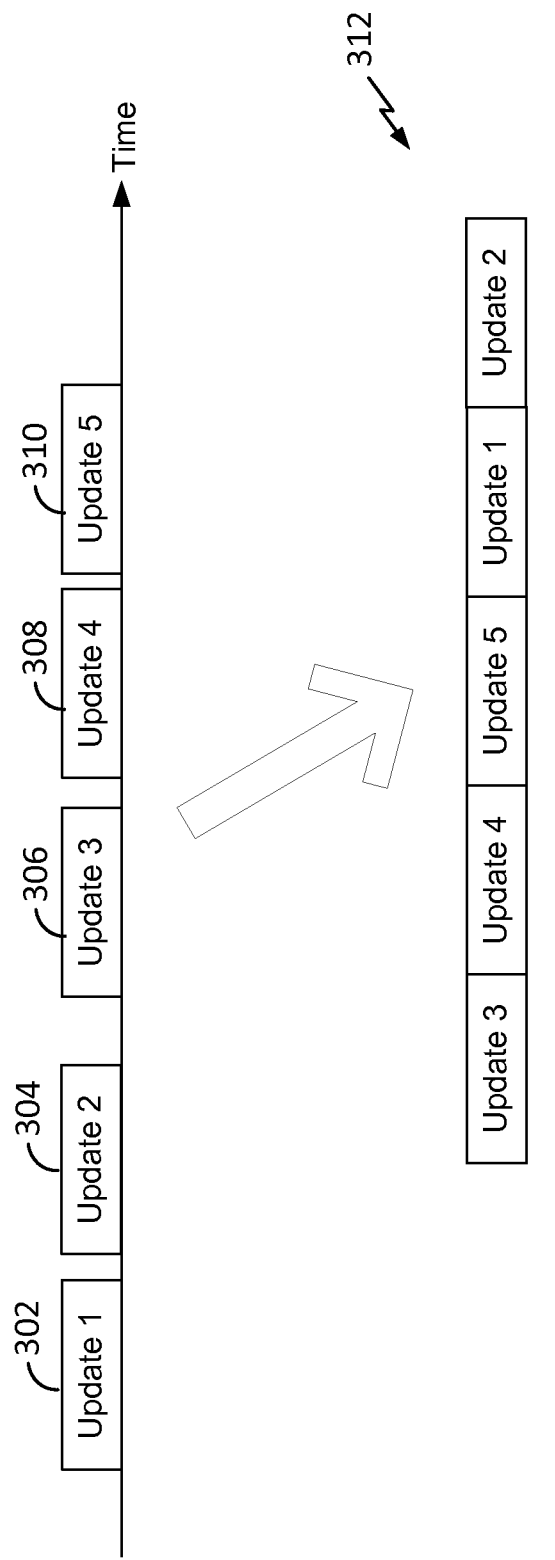
FIG. 3 is a drawing conceptually illustrating the scheduling of a number of event updates based on priority according to some embodiments.

According to aspects of the disclosure, a scheduling mechanism for the envelope updates is provided. The envelope updates are grouped into categories based on various factors, and the UE sends the updates to the SIM in their order of priority. For example, high priority updates or time-sensitive updates, can be sent to the SIM first, so that they need not unnecessarily wait for possible delays resulting from the processing of other, lower-priority updates. FIG. 3 is a drawing conceptually illustrating the scheduling of a number of event updates based on priority according to one aspect of the disclosure. Referring to FIG. 3, a UE (e.g., UE 200) receives a number of event updates 302, 304, 306, 308, and 310 that occur in sequence. In one aspect, the UE may reorder the event updates based on their respective priorities. For example, the UE may utilize a queue 312 to send the updates to a SIM (e.g., SIM 218) based on priority. In the queue 312, update 2 has the highest priority among the updates, and update 3 has the lowest priority. If the SIM is busy and cannot accept new updates, the updates may be temporarily stored in the queue 312. Subsequently, when the SIM is free to handle the event updates, the UE sends the updates in the queues 312 to the SIM based on their respective priorities. Accordingly, time-sensitive updates may be sent to the SIM ahead of other queued updates that are less time-sensitive.

Figure 4:
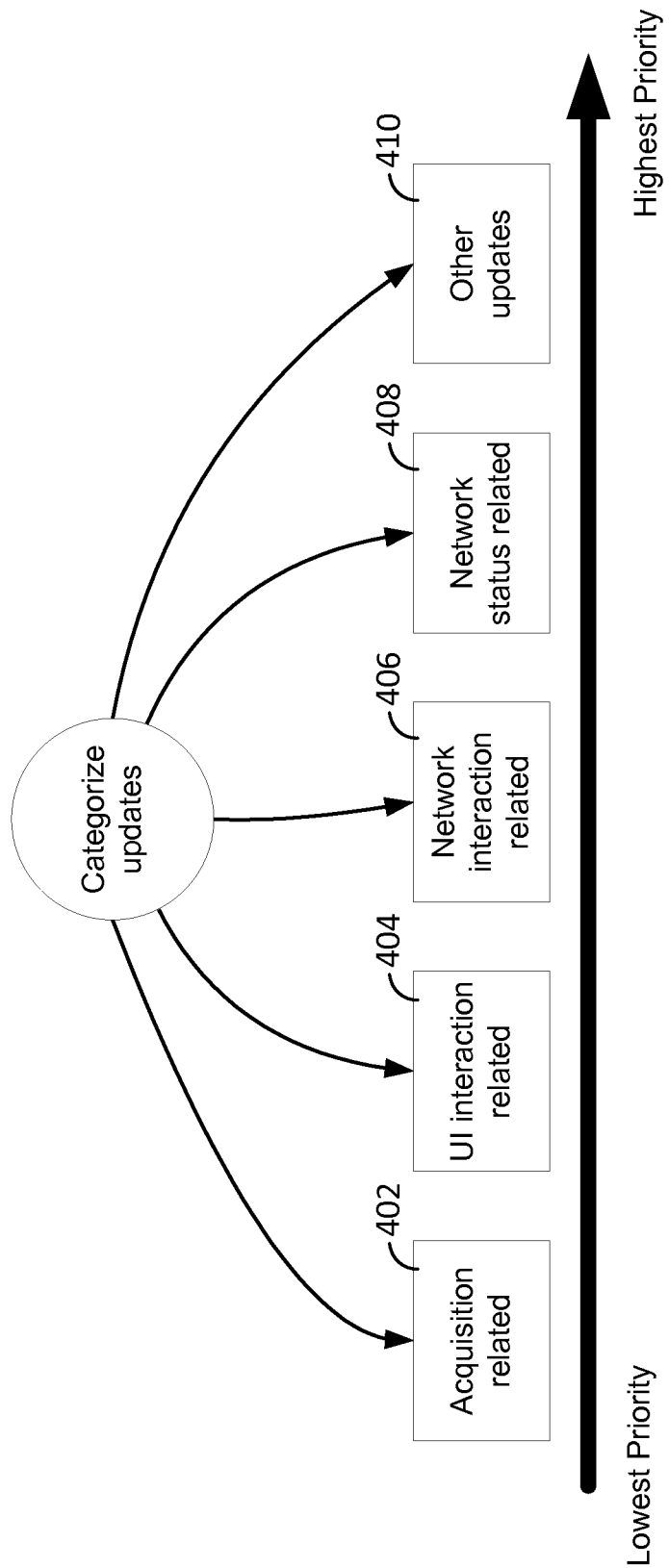
FIG. 4 is a drawing illustrating examples of event updates groups and their relative priority according to some embodiments.

FIG. 4 is a drawing illustrating examples of event updates groups and their relative priority according to one aspect. Once an update is received and its category determined by a UE (e.g., UE 200), it may be sent to a SIM (e.g., SIM 218) in accordance with a suitable order of priority. Referring to FIG. 4, event updates may be grouped into five groups such as an acquisition related group 402, a UI interaction related group 404, a network interaction related group 406, a network status related group 408, and an other updates group 410. In FIG. 4, the order of priority for updates are arranged from high to low priority as follows: acquisition related, UI interaction related, network interaction related, network status related, and other updates. However, the present disclosure is not limited to the groups and priorities of FIG. 4. In various aspects, other groupings and priorities may be used. In some aspects, the order of priority for updates within each group may be further prioritized into subgroups.

The acquisition related group 402 may include event updates such as call control for call setup and attach control. The UI interaction related group 404 may include event updates such as menu selection and language selection. The network interaction related group 406 may include event updates such as SMS point-to-point (SMS-PP) download, call connected event, call disconnected event, mobile terminated (MT) call event, data available for an embedded data call initiated by SIM card, and channel status event for status of an embedded data call initiated by SIM card. The network status related group 408 may include event updates such as access technology change event and location status event (e.g., service status including normal service, limited service, and no service). The other updates group 410 (e.g., a first group) may include event updates such as a browsing status event and a frames information changed event. However, the present disclosure is not limited to these groupings and events. In various aspects, other events and groupings may be used.

Figure 5:
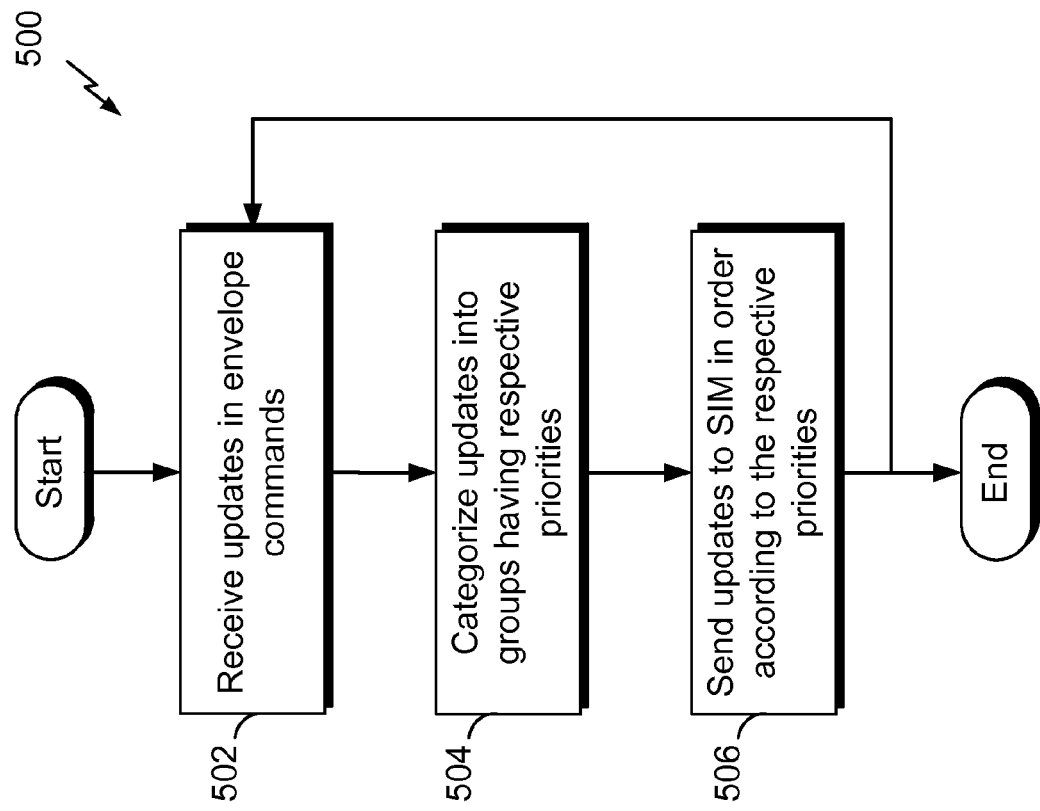
FIG. 5 is a flowchart illustrating a method of wireless communications operable at a user equipment in which event updates in envelope commands are grouped by priority according to some embodiments.

FIG. 5 is a flowchart illustrating a method 500 of wireless communication operable at a UE in which event updates in envelope commands are prioritized. Referring to FIG. 5, in block 502, a UE (e.g., UE 200) receives or generates a plurality of event updates that are to be communicated to a SIM (e.g., SIM 218) in one or more envelope commands. In block 504, the UE categorizes the updates into a number of groups or categories having respective priorities. For example, the updates may be grouped into an acquisition related group 402, a UI interaction related group 404, a network interaction related group 406, a network status related group 408, and an other updates group 410. However, other groupings may be used. In block 506, the UE sends the updates to the SIM in order according to the respective priorities of the updates. If more updates are to be processed and communicated to the SIM, the method may return to block 502 and repeats.

Figure 6:
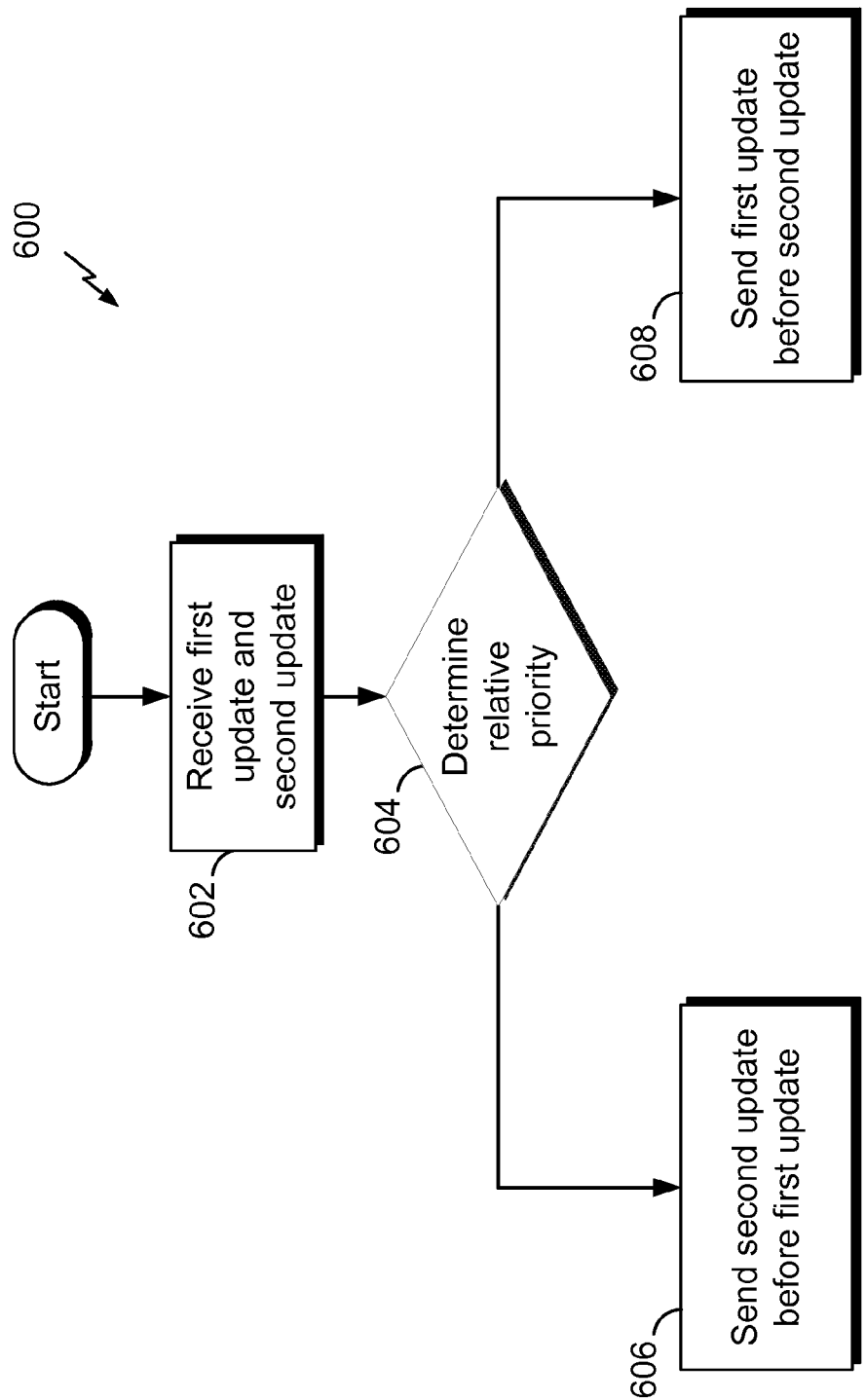
FIG. 6 is a flowchart illustrating a process of prioritized handling of updates according to some embodiments.

In some cases, a receiving order of the updates is different from a sending order of the updates. FIG. 6 is a flowchart illustrating a process 600 of prioritized handling of updates according to one aspect. Referring to FIG. 6, in block 602, a UE (e.g., UE 200) may receive a number of updates including a first update and a second update that is received after the first update. In block 604, the relative priorities of the first and second updates are determined. If the second update has a priority higher than that of the first update, the process continues to block 606; however, if the first update has a priority higher than that of the second update, the process continues to block 608. In block 606, the UE sends the second update to a SIM (e.g., SIM 218) before sending the first update. In block 608, however, the UE sends the first update to the SIM before sending the second data.

Figure 7:
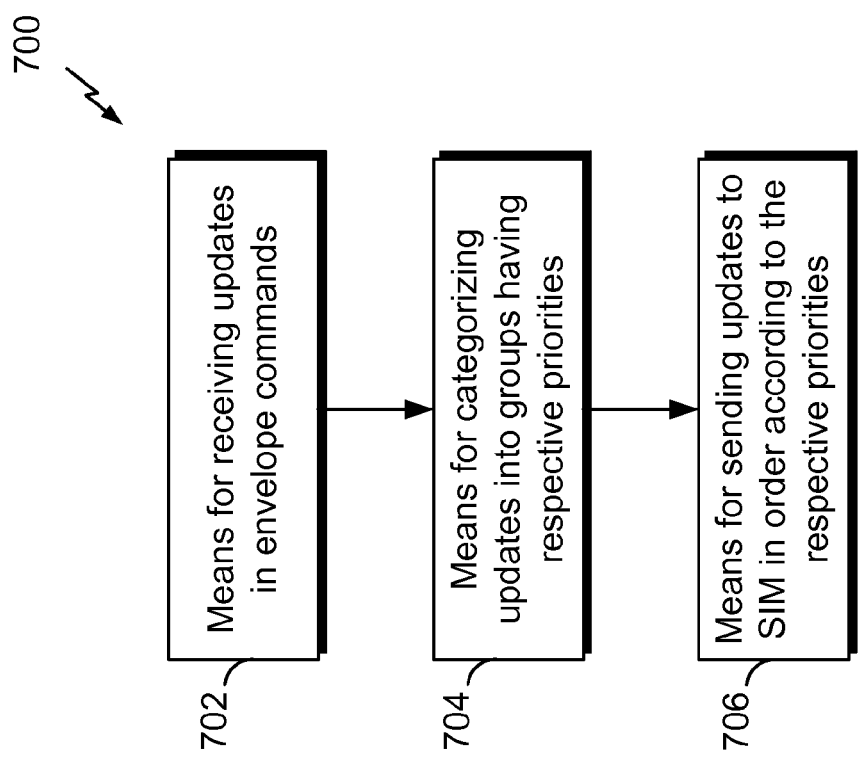
FIG. 7 is a functional block diagram of an apparatus for wireless communication according to some embodiments.

FIG. 7 is a functional block diagram of an apparatus 700 for wireless communication. In one configuration, as illustrated in FIG. 7, an apparatus 700 (e.g., UE 200) for wireless communication may include means 702 for receiving a plurality of updates in one or more envelope commands, means 704 for categorizing the updates into a plurality of groups having respective priorities, and means 706 for sending the updates to a SIM (e.g., SIM 218) at the apparatus in order according to the respective priorities. In one aspect, the aforementioned means may be the processor(s) 204 in which the invention resides from FIG. 2 configured to perform the functions recited by the aforementioned means. In another aspect, the aforementioned means may be a module or any apparatus configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA.

Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a mobile device, the method comprising:
   receiving a plurality of updates in one or more envelope commands;
   prior to sending the plurality of updates to a subscriber identity module (SIM) at the mobile device, categorizing the plurality of updates into a plurality of groups based on time-sensitivity, wherein the plurality of groups comprise a user interface (UI) interaction related group having a higher priority than that of at least one other group of the plurality of groups; and
   sending the plurality of updates to the SIM according to the time-sensitivity of the updates,
   wherein the updates in the UI interaction related group comprise a menu selection and a language selection.

2. The method of claim 1, wherein the plurality of groups comprise one or more of an acquisition related group, the UI interaction related group, a network interaction related group, a network status related group, or a first group.

3. The method of claim 2, wherein the categorizing the updates comprises categorizing the priorities of the groups from the highest to the lowest in the order of the acquisition related group, the UI interaction related group, the network interaction related group, the network status related group, and the first group.

4. The method of claim 2, wherein the updates in the acquisition related group comprise: a call control for call setup; and an attach control.

5. The method of claim 2, wherein the updates in the network interaction related group comprise:
   an SMS point-to-point download event;
   a call connected event;
   a call disconnected event;
   a mobile terminated call event;
   a data available for an embedded data call initiated by SIM card; and
   a channel status event for status of an embedded data call initiated by SLM card.

6. The method of claim 2, wherein the updates in the network status related group comprise: an access technology change event; and a location status event.

7. The method of claim 6, wherein the location status event comprises normal service, limited service, and no service.

8. The method of claim 2, wherein the first pup comprises: a browsing status event; and a frames information changed event.

9. An apparatus for wireless communication, comprising:
   means for receiving a plurality of updates in one or more envelope commands;
   means for prior to sending the plurality of updates to a subscriber identity module (SIM) at the apparatus, categorizing the plurality of updates into a plurality of groups based on time-sensitivity, wherein the plurality of groups comprise a user interface (UI) interaction related group having a higher priority than that of at least one other group of the plurality of groups; and
   means for sending the plurality of updates to the SIM according to the time-sensitivity of the updates,
   wherein the updates in the UI interaction related group comprise a menu selection and a language selection.

10. The apparatus of claim 9, wherein the plurality of groups comprise one or more of an acquisition related group, the UI interaction related group, a network interaction related group, a network status related group, or a first group.

11. The apparatus of claim 10, wherein the apparatus is configured to categorize the priorities of the groups from the highest to the lowest in the order of:
   the acquisition related group, the UI interaction related group, the network interaction related group, the network status related group, and the first group.

12. The apparatus of claim 10, wherein the updates in the acquisition related group comprise: a call control for call setup; and an attach control.

13. The apparatus of claim 10, wherein the updates in the network interaction related group comprise:
   an SMS point-to-point download event;
   a call connected event;
   a call disconnected event;
   a mobile terminated (MT) call event;
   a data available for an embedded data call initiated by SIM card; and
   a channel status event for status of an embedded data call initiated by SIM card.

14. The apparatus of claim 10, wherein the updates in the network status related group comprise: an access technology change event; and a location status event.

15. The apparatus of claim 14, wherein the location status event comprises normal service, limited service, and no service.

16. The apparatus of claim 10, wherein the first group comprises: a browsing status event; and a frames information changed event.

17. A computer program product, comprising:
a non-transitory computer-readable storage medium comprising code for causing a mobile device to:
receive a plurality of updates in one or more envelope commands;
prior to sending the plurality of updates to a subscriber identity module (SIM) at the mobile device, categorize the plurality of updates into a plurality of groups based on time-sensitivity, wherein the plurality of groups comprise a user interface (UI) interaction related group having a higher priority than that of at least one other group of the plurality of groups; and
send the plurality of updates to the SIM according to the time-sensitivity of the updates,
wherein the updates in the UI interaction related group comprise a menu selection and a language selection.

18. The computer program product of claim 17, wherein the plurality of groups comprise one or more of an acquisition related group, the UI interaction related group, a network interaction related group, a network status related group, or a first group.

19. The computer program product of claim 18, wherein the code causes the UE to categorize the priorities of the groups from the highest to the lowest in the order of:
the acquisition related group, the UI interaction related group, the network interaction related group, the network status related group, and the first group.

20. The computer program product of claim 18, wherein the updates in the acquisition related group comprise: a call control for call setup; and an attach control.

21. The computer program product of claim 18, wherein the updates in the network interaction related group comprise:
an SMS-PP download event;
a call connected event;
a call disconnected event;
a mobile terminated call event;
a data available for an embedded data call initiated by SIM card; and
a channel status event for status of an embedded data call initiated by SLM card.

22. The computer program product of claim 18, wherein the updates in the network status related group comprise: an access technology change event; and a location status event.

23. The computer program product of claim 22, wherein the location status event comprises normal service, limited service, and no service.

24. The computer program product of claim 18, wherein the first group comprises: a browsing status event; and a frames information changed event.

25. An apparatus for wireless communication, comprising:
at least one processor;
a communication interface coupled to the at least one processor; and
a memory coupled to the at least one processor, wherein the at least one processor is configured to:
receive a plurality of updates in one or more envelope commands;
prior to sending the plurality of updates to a subscriber identity module (SIM) at the apparatus, categorize the plurality of updates into a plurality of groups based on time-sensitivity, wherein the plurality of groups comprise a user interface (UI) interaction related group having a higher priority than that of at least one other group of the plurality of groups; and
send the plurality of updates to the SIM according to the time-sensitivity of the updates,
wherein the updates in the UI interaction related group comprise a menu selection and a language selection.

26. The apparatus of claim 25, wherein the plurality of groups comprise one or more of an acquisition related group, the UI interaction related group, a network interaction related group, a network status related group, or a first group.

27. The apparatus of claim 26, wherein the at least one processor is configured to categorize the priorities of the groups from the highest to the lowest in the order of:
the acquisition related group, the UI interaction related group, the network interaction related group, the network status related group, and the first group.

28. The apparatus of claim 26, wherein the updates in the acquisition related group comprise: a call control for call setup; and an attach control.

29. The apparatus of claim 26, wherein the updates in the network interaction related group comprise:
an SMS point-to-point download event;
a call connected event;
a call disconnected event;
a mobile terminated call event;
a data available for an embedded data call initiated by SIM card; and
a channel status event for status of an embedded data call initiated by SIM card.

30. The apparatus of claim 26, wherein the updates in the network status related group comprise: an access technology change event; and a location status event.

31. The apparatus of claim 30, wherein the location status event comprises normal service, limited service, and no service.

32. The apparatus of claim 26, wherein the first group comprises: a browsing status event; and a frames information changed event.

* * * * *